(12) United States Patent
Li et al.

(10) Patent No.: US 9,899,830 B2
(45) Date of Patent: Feb. 20, 2018

(54) METHOD FOR DETECTING FAULT AND CURRENT DIFFERENTIAL PROTECTION SYSTEM THEREOF

(71) Applicant: ABB Schweiz AG, Baden (CH)

(72) Inventors: Youyi Li, Beijing (CN); Kai Liu, Beijing (CN); Ivo Brncic, Vasteras (SE); Zhanpeng Shi, Vasteras (SE)

(73) Assignee: ABB Schweiz AG, Baden (CH)

( * ) Notice: Subject to any disclaimer, the term of this patent is extended or adjusted under 35 U.S.C. 154(b) by 240 days.

(21) Appl. No.: 14/770,240

(22) PCT Filed: Apr. 7, 2013

(86) PCT No.: PCT/CN2013/073797
§ 371 (c)(1),
(2) Date: Aug. 25, 2015

(87) PCT Pub. No.: WO2014/166027
PCT Pub. Date: Oct. 16, 2014

(65) Prior Publication Data
US 2016/0006240 A1  Jan. 7, 2016

(51) Int. Cl.
*H02H 9/02* (2006.01)
*H02H 3/28* (2006.01)
(Continued)

(52) U.S. Cl.
CPC .............. *H02H 9/02* (2013.01); *H02H 3/006* (2013.01); *H02H 3/28* (2013.01); *H02H 3/283* (2013.01); *H02H 7/045* (2013.01)

(58) Field of Classification Search
CPC ............ H02H 9/02; H02H 3/006; H02H 3/28; H02H 3/283; H02H 7/045
See application file for complete search history.

(56) References Cited

U.S. PATENT DOCUMENTS

| | | | |
|---|---|---|---|
| 2009/0009181 A1 | 1/2009 | Gangadharan et al. | |
| 2010/0254056 A1* | 10/2010 | Narendra | H02H 3/265 361/87 |

(Continued)

FOREIGN PATENT DOCUMENTS

| | | |
|---|---|---|
| CN | 102868150 A | 9/2013 |
| CN | 102868150 B | 4/2015 |

(Continued)

OTHER PUBLICATIONS

ISA/CN International Search Report dated Jan. 9, 2014 re PCT Application No. PCT/CN2013/073797, filed Apr. 7, 2013.

(Continued)

*Primary Examiner* — Scott Bauer
(74) *Attorney, Agent, or Firm* — Taft, Stettinius & Hollister LLP (57) ABSTRACT

The present invention discloses a method for detecting a fault and a current differential protection system thereof. The method for detecting fault includes calculating fault component currents, calculating an operate current and a restraint current of all terminals, and adjusting an operate level by adapting an operate-restraint characteristic according to a fault component. The method has very small operating area for external faults, which makes the method very reliable even for the case with serious CT saturation. A very big operating area for internal faults makes the method very sensitive for internal faults even for a heavy load and high resistance fault.

12 Claims, 4 Drawing Sheets

(51) Int. Cl.
*H02H 3/00* (2006.01)
*H02H 7/045* (2006.01)

(56) References Cited

U.S. PATENT DOCUMENTS

| | | | |
|---|---|---|---|
| 2010/0264749 A1* | 10/2010 | Guzman-Casillas | H02J 3/01 307/105 |
| 2012/0206149 A1 | 8/2012 | Su et al. | |
| 2012/0224287 A1 | 9/2012 | Rebizant et al. | |

FOREIGN PATENT DOCUMENTS

| | | |
|---|---|---|
| JP | 2001-197656 A | 7/2001 |
| JP | 2010-154641 A | 7/2010 |
| WO | WO2007086944 A2 | 8/2007 |
| WO | WO2012061978 A1 | 5/2012 |

OTHER PUBLICATIONS

Extended European Search Report, European Patent Application No. 13881637.6, dated Nov. 11, 2016, 7 pages.

\* cited by examiner

METHOD FOR DETECTING FAULT AND CURRENT DIFFERENTIAL PROTECTION SYSTEM THEREOF

FIELD OF THE INVENTION

The invention relates to the current differential protection technical field, and more particularly to a method for detecting fault and current differential protection system thereof.

BACKGROUND OF THE INVENTION

Current differential protection is widely used by power system as the main protection for its good performance. The algorithm of a classical current differential protection is shown below.

$$\begin{cases} |\dot{I}_L + \dot{I}_R| > k \cdot |\dot{I}_L - \dot{I}_R| \\ |\dot{I}_L + \dot{I}_R| > I_{dmin} \end{cases} \quad (1)$$

The classical current differential protection is based on full component currents. In the present invention, full component currents are also called total current. Here, full component current is the original current measurement, which consists of both load current and fault component current. And fault component current is the current which is caused only by fault. Load current is not included in fault component current.

The classical current differential protection mentioned above has some problems such as:
1. Low sensitivity and slow operation speed for heavy load conditions or high resistance faults.
2. Need additional function to block the possible mal-trip for external fault with CT saturation.
3. It's relatively difficult to balance sensitivity, speed and reliability in some sense. If we use low setting/threshold for good sensitivity and speed, we will get relatively bad reliability. And if we use high setting/threshold for good reliability, we will get relatively bad sensitivity and speed.

To resolve these problems, fault component differential protection which is based on only fault component current was proposed. The algorithm of a typical fault component based differential protection is shown below.

$$\begin{cases} |\Delta \dot{I}_L + \Delta \dot{I}_R| > 0.75 \times |\Delta \dot{I}_L - \Delta \dot{I}_R| \\ |\Delta \dot{I}_L + \Delta \dot{I}_R| > I_{dmin} \end{cases} \quad (2)$$

It has better sensitivity and speed than classical current differential relay for heavy load conditions and high resistance fault conditions generally, as the load currents are removed from the calculation.

But existing fault component differential protection only improves the sensitivity and speed in some sense. It does not resolve the reliability problem of CT saturation and it has not a good solution to get good balance between sensitivity and reliability.

Like classical full component based differential protection, the classical fault component differential protection described above in equation (2) may mal-trip during CT saturation if without additional CT blocking functions.

And in addition, it's difficult to get good balance between sensitivity, speed and reliability too. If they improve the sensitivity and speed for internal fault, they will reduce the reliability of external fault. On the other hand, if they improve the reliability of external fault, they will reduce the sensitivity and speed for internal fault.

To resolve the problem above, a prior application PCT/CN2012/076525 (A Method for Identifying the Fault by Current Differential Protection and a Device Thereof) was filed in June of 2012 and disclosed that the additional phase angle information and fault component are used to improve both the sensitivity and reliability of differential protection simultaneously. Furthermore, the new differential protection was immune to CT saturation inherently without any additional blocking functions.

The typical relay criterion in the prior application is shown below.

$$\begin{cases} |\Delta \dot{I}_L + \Delta \dot{I}_R| - I_{set1} \geq F(\theta_L, \theta_R) \cdot (\max(|\Delta \dot{I}_L|, |\Delta \dot{I}_R|) - I_{set2}) \\ \theta_L = \arg(\Delta \dot{I}_L) \\ \theta_R = \arg(\Delta \dot{I}_R) \end{cases} \quad (3)$$

Attribute to the adjusting factor of $F(\theta_L, \theta_R)$ based on phase angle information and fault component, the criterion (3) has adaptive characteristic and has very good sensitivity and reliability.

In some special cases, for example, reclosing or power swing, the calculation of fault component current may be difficult or has relatively bigger calculation error. Thus, another criterion based on full component current was also covered by this prior application as shown below.

$$\begin{cases} |\dot{I}_L + \dot{I}_R| - I_{set1} \geq F(\theta_L, \theta_R) \cdot (\max(|\dot{I}_L|, |\dot{I}_R|) - I_{set2}) \\ \theta_L = \arg(\dot{I}_L) \\ \theta_R = \arg(\dot{I}_R) \end{cases} \quad (4)$$

The criterion in equation (4) is based on full component like classical current differential protection. The criterion in equation (4) will satisfy some of the users who prefer classical full component based protection to fault component based protection. And at the same time, the criterion in equation (4) also has adaptive operate-restraint characteristic because of the adjusting factor of $F(\theta_L, \theta_R)$. It is also immune to CT saturation like criterion in equation (3).

But the criterion in equation (4) has less sensitivity than (3) generally; the main reason is that full component current includes load current, thereby, its sensitivity will be influenced obviously by load current especially for the fault cases with heavy load and high fault resistance.

On the other hand, the prior application only covered the adaptive differential protection which was based on pure fault component currents or pure full component currents. While the adaptive characteristic mentioned in prior application can be also implemented by hybrid fault information of both fault component and full component currents instead of pure fault component or pure full component currents.

By this means, the new protection algorithm based on hybrid fault information has the advantages of both full component and fault component and can achieve good balance between reliability and sensitivity.

SUMMARY OF THE INVENTION

To overcome the problems mentioned above, the present invention proposes a method for detecting fault in fault of a protected circuit thereof.

According to an aspect of the present invention, it provides a method for detecting fault of a protected circuit. The method comprises the steps of calculating fault component currents and the full component currents of all terminals; calculating the operate current and the restraint current basing on the full component currents; and adjusting the operate level by adapting an operate-restraint characteristic according to the fault component currents.

According to a preferred embodiment of the present invention, said fault component currents including the amplitudes and phase angles.

According to a preferred embodiment of the present invention, a phase angle difference between the fault component currents of different terminals is calculated by the phase angles of said fault component currents; and the operate-restraint characteristic is adaptively adjusted according to said phase angles difference.

According to a preferred embodiment of the present invention, the adjusting step includes enhancing the sensitivity for an internal fault, and enhancing the reliability for an external fault.

According to a preferred embodiment of the present invention, adjusting the operate-restraint characteristic comprises a step of determining an internal fault or an external fault according to the phase angle difference.

According to a preferred embodiment of the present invention, an internal fault or an external fault is determined by the phase angle difference being close to 0 degree or 180 degree.

According to the other aspect of the present invention, it provides a system for detecting fault. The system comprises: a calculating module, configured to calculate fault component currents and the full component currents of all terminals; and to calculate the operate current and the restraint current basing on the full component currents; and an adjusting module, configured to adjust the operate level by adapting an operate-restraint characteristic according to the fault component currents.

According to a preferred embodiment of the present invention, the fault component currents include the amplitudes and phase angles.

According to a preferred embodiment of the present invention, said calculating module is further configured to calculate a phase angle difference between the fault component currents of different terminals by the phase angles of said fault component currents; and said adjusting module is further configured to adjust the operate-restraint characteristic adaptively according to said phase angles difference.

According to a preferred embodiment of the present invention, the adjusting module is further configured to enhance the sensitivity for an internal fault and enhance the reliability for an external fault.

According to another preferred embodiment of the present invention, the adjusting module is further configured to determine an internal fault or an external fault according to the phase angle difference.

According to another preferred embodiment of the present invention, the adjusting module is further configured to determine an internal fault or an external fault by the phase angle difference being close to 0 degree or 180 degree.

The proposed new method provides a new differential protection principle, which use hybrid information of both full component and fault component currents. It uses fault component to do phase angle comparison and adjust the operate-restraint characteristic, which avoids the bad influence of load current on sensitivity. And for the other part of the criterion including the calculation of differential currents and restraint currents, it uses the full component currents.

BRIEF DESCRIPTION OF THE DRAWINGS

The subject matter of the invention will be explained in more details in the following description with reference to preferred exemplary embodiments which are illustrated in the drawings, in which.

DETAILED DESCRIPTION OF PREFERRED EMBODIMENTS

Exemplary embodiments of the present invention are described in conjunction with the accompanying drawings hereinafter. For the sake of clarity and conciseness, not all the features of actual implementations are described in the specification.

The proposed invention is for the current differential protection, which is based on the fact that the phase angles difference of currents from local and remote are different between internal fault and external fault. If the current reference directions of both terminals are from the busbar to the line, the phase difference is almost 0 degree for an internal fault and almost 180 degree for an external fault. Otherwise, if the current reference direction of one terminal is from the busbar to the line and the current reference direction of the other terminal is from the line to the busbar, the phase difference is almost 0 degree for an external fault and almost 180 degree for an internal fault. In the present invention, the description is based on the current reference directions of both terminals are from the busbar to the line. A person skilled in the art can easily understand the situation that the current reference direction of one terminal is from the busbar to the line and the reference direction of the other terminal is from the line to the busbar.

Such obvious difference can be used to weighting the restraint current (also called bias current) or the operate current (also called differential current) in the differential relay criterion to make the operate-restraint characteristic adaptive. By the way, the operate scope in operate-restraint characteristic will change according to the fault conditions. It will be very small for external fault and very large for internal fault. Thereby, better sensitivity for internal fault and better reliability for external fault can be achieved at the same time.

Figure 1A:
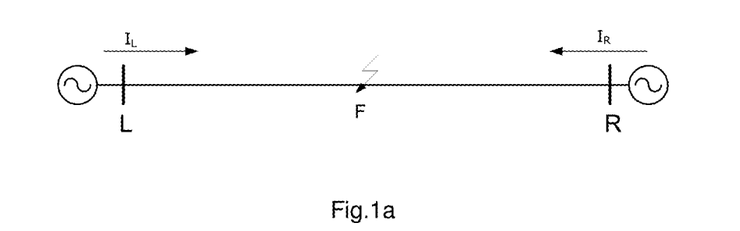
FIG. 1 illustrates a typical two-terminal power system with an internal fault (FIG. 1a) and the corresponding fault component network (FIG. 1b)
Figure 1B:
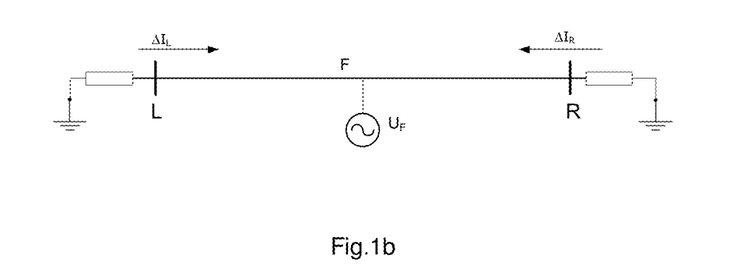

FIG. 1a illustrates a typical two-terminal power system with an internal fault, and FIG. 1b illustrates the fault component network of FIG. 1a.

As shown in FIG. 1a, $\dot{I}_L$ and $\dot{I}_R$ are the vectors of measured currents by the differential protection at the two terminals (in the present invention, all terminals mean the ends of a protected circuit) L and R. And $\Delta \dot{I}_L$ and $\Delta \dot{I}_R$ are the corresponding fault component currents of the two terminals.

The general equation of the proposed algorithm is shown below.

$$\begin{cases} |\dot{I}_L + \dot{I}_R| - I_{set1} \geq F(\theta_L, \theta_R) \cdot (I_{res} - I_{set2}) \\ |\dot{I}_L + \dot{I}_R| \geq I_{set3} \\ \theta_L = \arg(\Delta \dot{I}_L) \\ \theta_R = \arg(\Delta \dot{I}_R) \\ |\Delta \dot{I}_L| > I_{lim} \text{ AND } |\Delta \dot{I}_R| > I_{lim} \end{cases} \quad (5)$$

Here, $I_{set1}$ and $I_{set2}$ are the current settings for controlling the origin of the slope in operate characteristic. In an embodiment of the present invention, the two setting values can be set as below: $I_{set1} \geq 0$, $I_{set2} \leq 0$. It shall be noted that the values $I_{set1}$ and $I_{set2}$ can be preset as any values by the person skilled in the art according to the actual implementation.

$I_{set3}$ is mainly for charging current. And $I_{lim}$ is to ensure the calculation accuracy of current phase angle. $I_{res}$ is the restraint current, it could be calculated by any reasonable methods such like $\max(|\dot{I}_L|, |\dot{I}_R|)$, $|\dot{I}_R - \dot{I}_L|$, $|\dot{I}_R| + |\dot{I}_L|$, or others. Here, $F(\theta_L, \theta_R)$ is a general function of the fault component current phases, which should increase the sensitivity of protection to speed up the operation for internal fault; and increase the reliability to block the mal-operation for external fault. The design of $F(\theta_L, \theta_R)$ is based on the fact that phase angle difference of $(\theta_R - \theta_L)$ is almost 0° for internal fault and almost 180° for external fault. The corresponding vector diagram is shown below.

Figure 2:
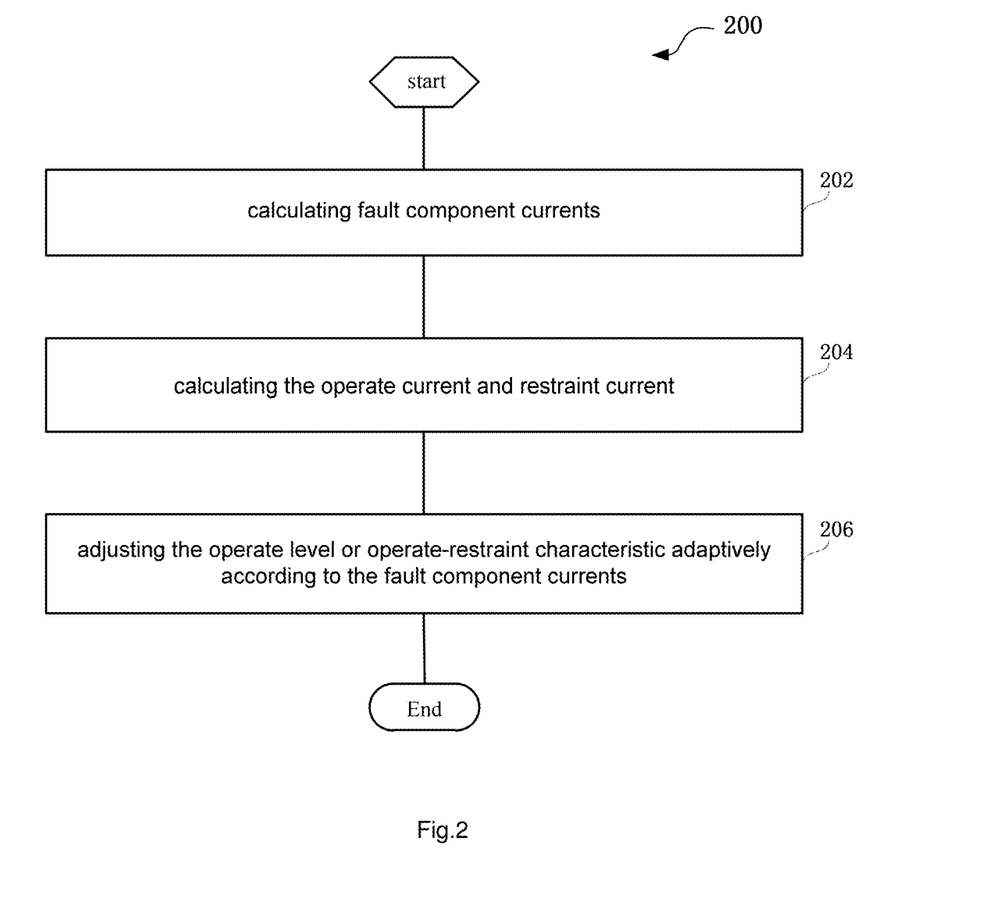
FIG. 2 illustrates a flow chart of the method for detecting the fault according to an embodiment of the present invention.

FIG. 2 illustrates a flow chart of the method for identifying the fault by current differential protection according to the present invention.

As shown in FIG. 2, the method 200 for identifying the fault by current differential protection comprises:

Step 202, calculate fault component currents. In detail, the fault component currents are used to calculate the amplitudes and corresponding phase angles. The phase angles of fault component currents are used to calculate the angle difference between currents of different terminals. In a preferred embodiment, the angles difference of fault component currents are used to adjust the operate level or operate-restraint characteristic adaptively.

Step 204, calculate the operate current and restraint current.

Step 206, adjust the operate level or operate-restraint characteristic adaptively according to the fault component currents. Moreover, the adjusting step further uses the operate current and/or restraint current, which achieves enhancing the sensitivity for internal fault, and enhancing the reliability for external fault.

Figure 3A:
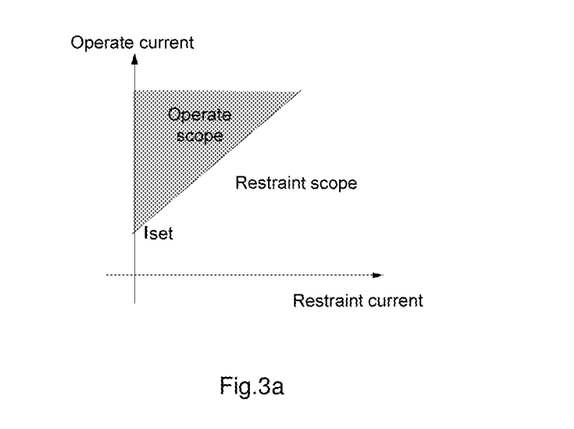
FIGS. 3a and 3b illustrates operate-restraint characteristic of the differential relay for external fault and internal fault respectively.
Figure 3B:
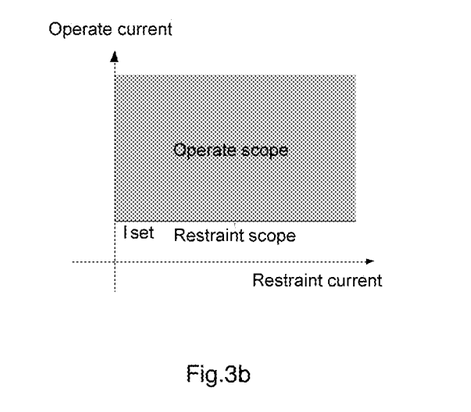

FIGS. 3a and 3b illustrates operate-restraint characteristic of the differential relay for external fault and internal fault respectively.

As shown in FIGS. 3a and 3b, one simple implementation of $F(\theta_L, \theta_R)$ can be $$K_1 - K_2 \cdot \cos(\theta_R - \theta_L) \quad (6)$$

This is only one possible instance; any implementation which can meet the requirement of $F(\theta_R, \theta_L)$ mentioned above can be used in theory.

Using equation (6) to replace the general function $F(\theta_L, \theta_R)$, the equation (5) can be rewritten as below.

$$\begin{cases} |\dot{I}_R + \dot{I}_L| - I_{set1} \geq (K_1 - K_2 \cdot \cos(\theta_R - \theta_L)) \cdot (I_{res} - I_{set2}) \\ |\dot{I}_R + \dot{I}_L| \geq I_{set3} \\ \theta_R = \arg(\Delta \dot{I}_R) \\ \theta_L = \arg(\Delta \dot{I}_L) \\ |\Delta \dot{I}_R| > I_{lim} \text{ AND } |\Delta \dot{I}_L| > I_{lim} \end{cases} \quad (6)$$

To simplify the algorithm, the setting value of $I_{set2}$ can be zero. Iset1 and Iset3 can have the same value. And furthermore, the $K_1$ could be set as same with $K_2$. Thereby, the simplified version of equation (7) is shown below.

$$\begin{cases} |\dot{I}_R + \dot{I}_L| \geq (K - K \cdot \cos(\theta_R - \theta_L)) \cdot I_{res} + I_{set} \\ \theta_R = \arg(\Delta \dot{I}_R) \text{ AND } \theta_L = \arg(\Delta \dot{I}_L) \\ |\Delta \dot{I}_L| > I_{lim} \text{ AND } |\Delta \dot{I}_R| > I_{lim} \end{cases} \quad (8)$$

Here, K is a positive value (e.g. K=1.5). This simplified and also typical operate characteristic diagram of proposed differential protection is shown below.

Figure 4A:
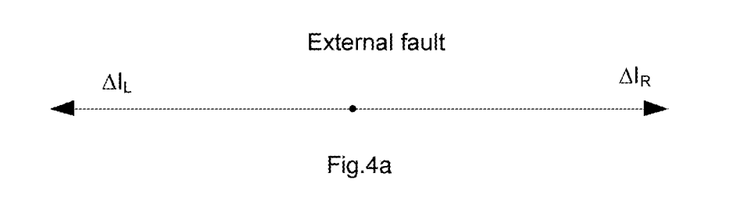
FIGS. 4a and 4b illustrate the vector diagrams of fault component current in case of an external fault and an internal fault respectively.
Figure 4B:
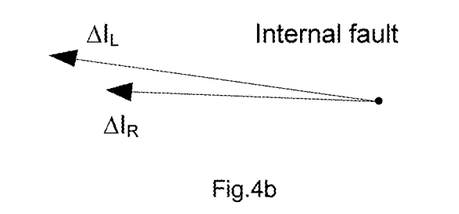

FIGS. 4a and 4b illustrate the vector diagrams of fault component current in case of an external fault and an internal fault respectively.

As above mentioned, the slope ratio in operate-restraint (is also called operate-restrain) characteristic is controlled by $F(\theta_L, \theta_R)$, for instance $(K_1 - K_2 \cdot \cos(\theta_L - \theta_R))$. The slope in the operate characteristics should be small for internal and big for external; as a result, the operate scope is big for internal fault and small for external fault and. And even during the external fault with serious CT saturation, the slope ratio $(K - K \cdot \cos(\theta_L - \theta_R))$ is a big positive value if K has a proper setting, which makes the algorithm reliable enough for CT saturation. Generally, $(\theta_L - \theta_R)$ is almost 0° for an internal fault shown in FIG. 4b and almost 180° for an external fault shown in FIG. 4a.

Figure 5:
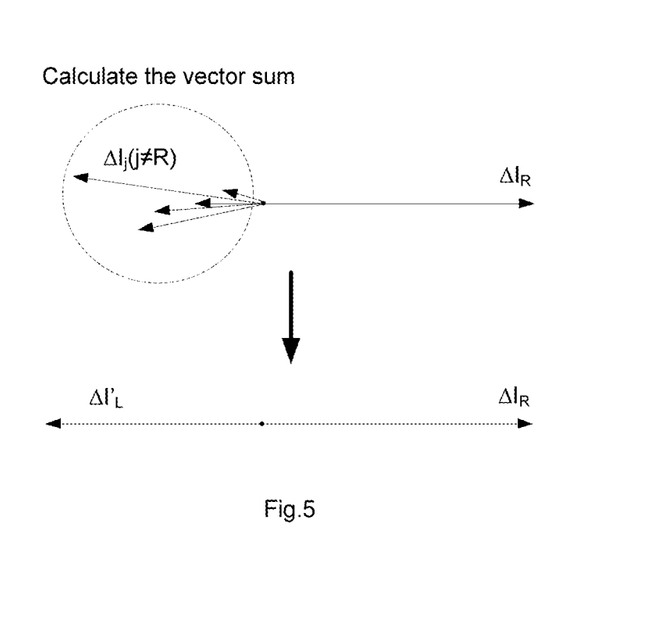
FIG. 5 illustrates the vector diagrams for converting multi-terminal system into a virtual two-terminal system according to the present invention.

FIG. 5 illustrates a vector diagram for converting multi-terminal system into a virtual two-terminal system according to the present invention.

As shown in FIG. 5, for converting multi-terminal system into a virtual two-terminal system, firstly measure the full component currents of all terminals of a multi-terminal line system and calculating the corresponding fault component current vectors. Select the maximum from the calculated fault component currents, calculate the sum of all the other calculated fault component currents except the maximum; and then deem the maximum current and the sum current as the currents of a virtual two-terminal system.

After a multi-terminal system is converted into a virtual two-terminal system, the method mentioned in FIG. 1 can be applied for identifying the fault by current differential protection.

According to a preferred embodiment, if at least one of current amplitude is too small to measure phase angle, for example, $|\dot{I}_L| < I_{lim}$ and/or $|\dot{I}_R| < I_{lim}$; a fixed control factor K can be used to replace the adaptive factor $F(\theta_L, \theta_R)$.

In detail, the method comprises: measuring the full component currents of the two terminals of a two-terminal line system, i.e. $\dot{I}_R$ and $\dot{I}_L$; obtaining an operate value $|\dot{I}_L+\dot{I}_R|-I_{set1}$ by calculating a first difference between an absolute value of the sum of the full component current vectors and a first preset value $I_{set1}$; obtaining a restraint value (is also called restrain value) by multiplying a second difference with a control factor $F(\theta_L, I_R)$, in which the second difference is calculated between the maximum of the absolute values of the full component currents and a second preset value $I_{set2}$; and identifying a fault as an external one or internal one by comparing the operate value with the restraint value. That's to say, the judgment criterion is rewritten as the following:

$$|\dot{I}_L+\dot{I}_R|-I_{set1} \leq F(\theta_L,\theta_R)\cdot(\max(|\dot{I}_L|,|\dot{I}_R|)-I_{set2})$$

Figure 6:
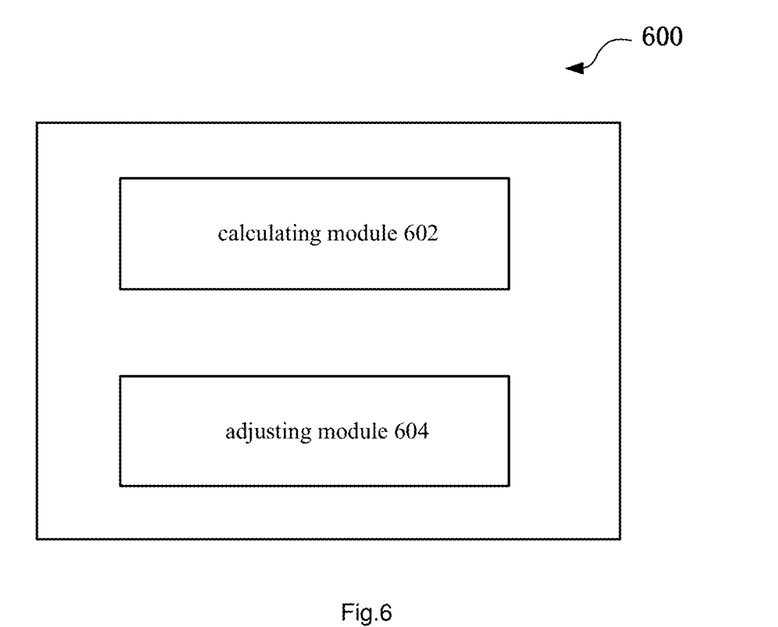
FIG. 6 illustrates a diagram of the system for detecting the fault according to an embodiment of the present invention.

FIG. 6 illustrates a system for detecting fault according to an embodiment of the present invention.

As shown in FIG. 6, the system 600 for detecting fault mainly comprises: a calculating module 602 and an adjusting module 604.

The calculating module 602 is configured to calculate fault component currents, the operate current and restraint current. The fault component currents are used to calculate the amplitudes and the corresponding angles. The angles of fault component currents are used to calculate the angle difference between currents of different terminals.

The adjusting module 604 is configured to adjust the operate level or operate-restraint characteristic adaptively according to the fault component currents. In a preferred embodiment, the angles difference of fault component currents are used to adjust the operate level or operate-restraint characteristic adaptively, and the adjusting module further uses the operate current and/or restraint current to enhance the sensitivity for internal fault and the reliability for external fault.

The present invention also provides a current differential protection system, wherein comprises: at least one current sensor, configured to measure the currents at different terminals; at least one fault detection unit, configured to calculate fault component currents, calculate the operate current and restraint current; and adjust the operate level or operate-restraint characteristic adaptively according to the fault component currents, detect internal fault or external fault, and release a tripping signal. Furthermore, the system further comprises at least one communication unit, configured to exchange the measurements and signals among terminals.

With the teaching of the proposed solution of the present invention, the skilled in the art can design or manufacture the differential current protection with better reliability, sensitivity and faster speed than existing products.

It shall be noted that the method for identifying the fault by current differential protection and device thereof provided in the present invention can be used in but not limited to the line differential protection or differential protection for main equipment, for example the generator protection, the busbar protection, the capacitor protection, the transform protection, the reactor protection, the motor protection or other protections based on current differential algorithm etc.

Based on the teaching of the present invention, the person skilled in art appreciates the following technical benefits and effects:

1. According to the present invention, the method for detecting fault and system thereof have very small operate scope for external fault, which makes it very reliable even for the case with serious CT saturation. While it has very big operate scope for internal fault, which makes it very sensitive for internal fault even for heavy load and high impedance fault.

2. In comparison with existing differential protections, the method for detecting fault and system thereof are faster than before due to its enhanced sensitivity for internal fault and reliability for external fault.

3. Furthermore, the differential currents and restraint currents are based on full component instead of fault component, which decreases the bad influence from the calculation error for fault component currents.

Though the present invention has been described on the basis of some preferred embodiments, those skilled in the art should appreciate that those embodiments should by no means limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A method for detecting fault of a protected circuit, comprising:
    operating at least one current sensor so as to measure full component currents of two terminals, each full component current including a fault component current and a load component current;
    calculating fault component currents for each terminal using the measured full component currents, each fault component current including a phase angle;
    calculating a phase angle difference using the phase angle of each fault component current;
    calculating an operate current and a restraint current based on the full component currents;
    adjusting an operate level by adapting an operate-restraint characteristic according to the calculated phase angle difference; and
    releasing a trip signal in response to the operate current exceeding the operate level.

2. The method according to the claim 1, wherein said fault component currents include amplitudes and phase angles.

3. The method according to the claim 1, wherein adjusting includes:
    enhancing a sensitivity for an internal fault, and enhancing a reliability for an external fault.

4. The method according to claim 1, wherein adjusting the operate-restraint characteristic comprises:
    determining an internal fault or an external fault according to the phase angle difference.

5. The method according to claim 4, wherein at least one of an internal or an external fault is determined by the phase angle difference being close to 0 degree or 180 degree.

6. The method according to claim 3, wherein enhancing the sensitivity for the internal fault includes decreasing a threshold value required for the operation of the protection.

7. The method according to claim 3, wherein enhancing the reliability for the external fault includes increasing a threshold value required for the operation of the protection so that unwanted operation is avoided.

8. A system for detecting fault of a protected circuit, comprising:
    at least one current sensor configured to measure full component currents at all terminals; and
    a fault detection unit configured to:
        calculate fault component currents using the measured full component currents wherein each full component current includes a fault component current and a load component current, calculate a phase angle difference using the phase angle of each fault component current, calculate an operate current and a restraint current based on the full component currents, adjust an operate level by adapting an operate-restraint characteristic according to the phase angle difference, and release a trip signal in response to the operate current exceeding the adjusted operate level.

9. The system according to claim 8, wherein the fault component currents include amplitudes and phase angles.

10. The system according to claim 8, wherein the fault detection unit is further configured to enhance a sensitivity for an internal fault and enhance a reliability for an external fault.

11. The system according to claim 8, wherein the fault detection unit is further configured to determine an internal fault or an external fault according to a phase angle difference.

12. The system according to claim 11, wherein the fault detection unit is further configured to determine a fault to be an internal fault or an external fault by the phase angle difference being close to 0 degree or 180 degree.

* * * * *